(12) United States Patent
Zhou et al.

(10) Patent No.: US 9,077,496 B2
(45) Date of Patent: Jul. 7, 2015

(54) METHOD, BASE STATION, AND TERMINAL FOR GENERATING REFERENCE SIGNAL

(75) Inventors: Mingyu Zhou, Beijing (CN); Lei Wan, Beijing (CN); Xiaotao Ren, Beijing (CN); Yuan Xia, Beijing (CN); Zuomin Wu, Beijing (CN); Qiang Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 13/584,330

(22) Filed: Aug. 13, 2012

(65) Prior Publication Data
US 2012/0307868 A1 Dec. 6, 2012

Related U.S. Application Data

(63) Continuation of application No. PCT/CN2011/070906, filed on Feb. 10, 2011.

(30) Foreign Application Priority Data
Feb. 12, 2010 (CN) .......................... 2010 1 0113536

(51) Int. Cl.
H04W 84/18 (2009.01)
H04W 84/12 (2009.01)
(Continued)

(52) U.S. Cl.
CPC ............ *H04L 5/0051* (2013.01); *H04L 5/0035* (2013.01); *H04L 5/0053* (2013.01); *H04L 27/2613* (2013.01)

(58) Field of Classification Search
None
See application file for complete search history.

(56) References Cited

U.S. PATENT DOCUMENTS

2008/0318608 A1  12/2008  Inoue et al.
2009/0060004 A1* 3/2009  Papasakellariou et al. ... 375/140
(Continued)

FOREIGN PATENT DOCUMENTS

CN  101330321 A  12/2008
CN  101442808 A  5/2009
(Continued)

OTHER PUBLICATIONS

NEC Group and NT DoCoMo, "UL RS Enhancement for LTE-Advanced," R1-094911, (Original: R1-092801): *3GPP TSG RAN WG1 Meeting #59, Agenda Item*: 7.4.1, Nov. 9-13, 2009, pp. 1-6, 3rd Generation Partnership Project, Jeju, Korea.
(Continued)

*Primary Examiner* — Hassan Phillips
*Assistant Examiner* — Gautam Sharma
(74) *Attorney, Agent, or Firm* — Staas & Halsey LLP

(57) ABSTRACT

The present invention relates to a method for generating a reference signal, including: obtaining first control information, where the first control information indicates or includes cyclic shift related information which is used by a terminal belonging to a serving cell to send a reference signal; and sending the first control information to the terminal belonging to the serving cell, so that the terminal belonging to the serving cell generates the reference signal according to the cyclic shift related information which is indicated or included by the first control information and used by the terminal to send the reference signal, where a variation rule of a cyclic shift which the terminal belonging to the serving cell uses to generate the reference signal is the same as that of a cyclic shift which a terminal belonging to a coordinated cell uses to generate the reference signal.

10 Claims, 3 Drawing Sheets

(51) Int. Cl.
*H04W 88/06* (2009.01)
*H04W 88/08* (2009.01)
*H04W 80/04* (2009.01)
*H04W 72/04* (2009.01)
*H04W 76/00* (2009.01)
*H04L 5/00* (2006.01)
*H04L 27/26* (2006.01)

(56) References Cited

U.S. PATENT DOCUMENTS

| | | |
|---|---|---|
| 2010/0067464 A1 | 3/2010 | Higuchi |
| 2010/0272152 A1 | 10/2010 | Kishiyama et al. |
| 2011/0305226 A1 | 12/2011 | Zhang et al. |
| 2012/0063400 A1* | 3/2012 | Papasakellariou et al. ... 370/329 |
| 2012/0099544 A1* | 4/2012 | Pajukoski et al. ............ 370/329 |
| 2012/0106473 A1* | 5/2012 | Tiirola et al. ................. 370/329 |
| 2012/0201275 A1 | 8/2012 | Tiirola et al. |
| 2012/0263136 A1 | 10/2012 | Higuchi |
| 2012/0307868 A1* | 12/2012 | Zhou et al. .................... 375/130 |
| 2013/0114523 A1* | 5/2013 | Chatterjee et al. ........... 370/329 |
| 2013/0223389 A1* | 8/2013 | Papasakellariou et al. ... 370/329 |

FOREIGN PATENT DOCUMENTS

| | | |
|---|---|---|
| EP | 2040409 A2 | 3/2009 |
| JP | 2008-236430 | 10/2008 |
| JP | 2009-89190 | 4/2009 |
| WO | 2008/114724 A1 | 9/2008 |

OTHER PUBLICATIONS

Panasonic, "OCC and CS for UL RS in SU/MU-MIMO," R1-100378: *3GPP TSG RAN WG1 Meeting #59bis, Agenda Item:* 7.4.1, Jan. 18-22, 2010, pp. 1-6, 3rd Generation Partnership Project, Valencia, Spain.

Japanese Office Action issued Feb. 18, 2014, in corresponding Japanese Patent Application No. 2012-552249.

*Discussion of PUCCH coordination for UL CoMP*, 3GPP TSG RAN WG1 Meeting #56, R1-090687, Feb. 9-13, 2009, pp. 1-2.

Office Action, dated Jan. 31, 2013, in corresponding Chinese Application No. 201010113536.6 (14 pp.).

Extended European Search Report mailed Jan. 2, 2013.

Written Opinion of the International Searching Authority mailed May 19, 2011 for corresponding International Application No. PCT/CN2011/070906.

Panasonic, "Cell Specific Cyclic Shift Hopping v.s. UE specific Cyclic Shift Hopping for Uplink ACK/NACK Signals", 3GPP TSG RAN WG1, Meeting #50, Aug. 20-24, 2007, R1-073619, pp. 1-4.

Panasonic, "Discussion on PUCCH coordination for UL CoMP", 3GPP TSG RAN WG1, Meeting #56, Feb. 9-13, 2009, RI-090687, pp. 1-2.

Motorola, "RI-100197: Further Views on LTE-A Uplink DM RS", Agenda 7.4.1, Document for Disussion/Decision, 3GPP RAN WG1 #59bis, Jan. 18-22, 2010, pp. 1-7.

Office Action, dated Aug. 9, 2013, in corresponding Japanese Application No. 2012-552249 (10 pp.).

International Search Report of Corresponding PCT Application PCT/CN2011/070906 mailed May 19, 2011.

Japanese Notice of Allowance dated Nov. 11, 2014 in corresponding Japanese Patent Application No. 2012-552249.

"Analysis and evaluation of UL DM RS design for LTE-A scenarios", Huawei, 3GPP TSG RAN WG1 Meeting #59bis, Jan. 2010, 8 pp.

* cited by examiner

US 9,077,496 B2

METHOD, BASE STATION, AND TERMINAL FOR GENERATING REFERENCE SIGNAL

CROSS-REFERENCE TO RELATED APPLICATIONS

This application is a continuation of International Application No. PCT/CN2011/070906, filed on Feb. 10, 2011, which claims priority to Chinese Patent Application No. 201010113536.6, filed on Feb. 12, 2010, both of which are hereby incorporated by reference in their entireties.

FIELD OF THE INVENTION

The present invention relates to communication technologies, and in particular, to a method, base station, and terminal for generating a reference signal.

BACKGROUND OF THE INVENTION

In a prior art, a user equipment (UE, User Equipment, or "terminal") sends data and a reference signal (RS, Reference Signal) to a cell receiver, so that the cell receiver estimates channel fading by using the reference signal and uses the estimated channel fading to check the data sent by the UE; a base station may allocate orthogonal RSs to different UEs in one cell. For example, a base station in a long term evolution (LTE, long term evolution) system may allocate different cyclic shifts (CS, Cycle Shift) to different UEs to ensure that RSs sent by different UEs are orthogonal. In this way, the base station can receive signals of multiple UEs, and in this case, signals sent by the UEs of other cells cause interference in the reception of the base station.

To achieve randomization of inter-cell interference to avoid strong interference in all of multiple RSs in one data transmission process, an RS hopping technology is introduced. For example, in the LTE system, RSs sent by a UE in different timeslots adopt different CSs, and CS hopping rules adopted by UEs in different cells are different, and thereby, inter-cell interference may be randomized.

With the continuous progress of technologies, a coordinated multiple point transmission/reception (CoMP, Coordinated Multiple Point Transmission/Reception) technology is adopted, where a signal sent by a UE can be received by multiple cells so as to enhance reception performance. Although the randomization of inter-cell interference reduces interference between UEs to some extent so that a coordinated cell and a serving cell in CoMP may accurately demodulate the reference signal sent by the UE. However, during implementation of the present invention, the inventor finds that, in the prior art, in a combination of the CoMP technology and RS hopping technology, inter-cell interference is randomized, but it cannot be ensured that RSs sent by multiple UEs are orthogonal, which cause strong interference between UEs in the coordinated cell of CoMP, and reduces the reception performance of the cell.

SUMMARY OF THE INVENTION

Embodiments of the present invention provide a method, base station, and terminal for generating a reference signal, so that reference signals sent by UEs of multiple cells have a same hopping rule, thus ensuring good orthogonality between the reference signals sent by the multiple UEs.

In one aspect, the present invention provides a method for generating a reference signal, including:

obtaining first control information, where the first control information indicates or includes cyclic shift related information which is used by a terminal belonging to a serving cell to send a reference signal; and sending the first control information to the terminal belonging to the serving cell, so that the terminal belonging to the serving cell generates the reference signal according to the cyclic shift related information which is indicated or included by the first control information and used by the terminal to send the reference signal, where a variation rule of a cyclic shift which the terminal belonging to the serving cell uses to generate the reference signal is the same as that of a cyclic shift which a terminal belonging to a coordinated cell uses to generate a reference signal.

In another aspect, the present invention provides another method for generating a reference signal, including:

receiving, by a terminal, first control information sent by a serving cell, where the first control information is used to indicate cyclic shift related information which is used by the terminal to send a reference signal; and generating, by the terminal, a reference signal according to the cyclic shift related information which is indicated or included by the first control information and used by the terminal to send the reference signal, and sending the reference signal, where a variation rule of a cyclic shift which the terminal uses to generate the reference signal is the same as that of a cyclic shift which a terminal belonging to a coordinated cell uses to generate a reference signal.

In still another aspect, the present invention provides a base station, including:

an obtaining unit, configured to obtain first control information, where the first control information indicates or includes cyclic shift related information which is used by a terminal to send a reference signal; and a sending unit, configured to send the first control information to the terminal belonging to a serving cell, so that the terminal belonging to the serving cell generates the reference signal according to the cyclic shift related information which is indicated or included by the first control information and used by the terminal to send the reference signal, where a variation rule of a cyclic shift which the terminal belonging to the serving cell uses to generate the reference signal is the same as that of a cyclic shift which a terminal belonging to a coordinated cell uses to generate a reference signal.

In still another aspect, the present invention provides a terminal, including:

a first receiving unit, configured to receive first control information sent by a serving cell, where the first control information indicates or includes cyclic shift related information which is used by the terminal to send a reference signal; and a reference signal generating unit, configured to generate the reference signal according to the cyclic shift related information which is indicated or included by the first control information and used by the terminal to send the reference signal, and send the reference signal, where a variation rule of a cyclic shift which the terminal uses to generate the reference signal is the same as that of a cyclic shift which a terminal belonging to a coordinated cell uses to generate a reference signal.

In the technical solutions, with the method, base station, and terminal for generating a reference signal which are provided in the embodiments of the present invention, the UE belonging to the serving cell and the UE belonging to the coordinated cell use a same cyclic shift hopping rule, so that good orthogonality is ensured between the reference signal of the UE belonging to the serving cell and the reference signal of the UE belonging to the coordinated cell which are received in the coordinated cell, so that the coordinated cell demodulates signals of the two cells more accurately, and thereby, the signal transmission performance of the UEs is enhanced.

BRIEF DESCRIPTION OF THE DRAWINGS

To illustrate technical solutions of embodiments of the present invention more clearly, accompanying drawings to be used in the description of the embodiments of the present invention are briefly introduced in the following. It is apparent that the accompanying drawings are only some of the embodiments of the present invention. Persons of ordinary skill in the art can derive other drawings from these accompanying drawings without creative efforts.

DETAILED DESCRIPTION OF THE EMBODIMENTS

To make those skilled in the art better understand technical solutions of embodiments of the present invention, the embodiments of the present invention are illustrated in detail with reference to accompanying drawings and implementation manner.

Figure 1:
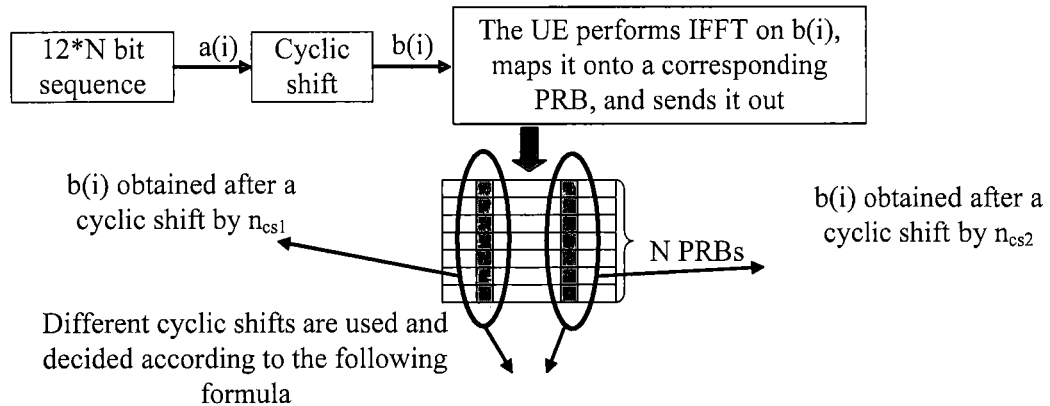
FIG. 1 is a schematic diagram of a method for generating an RS by a UE according to an embodiment of the present invention.
Figure 2:
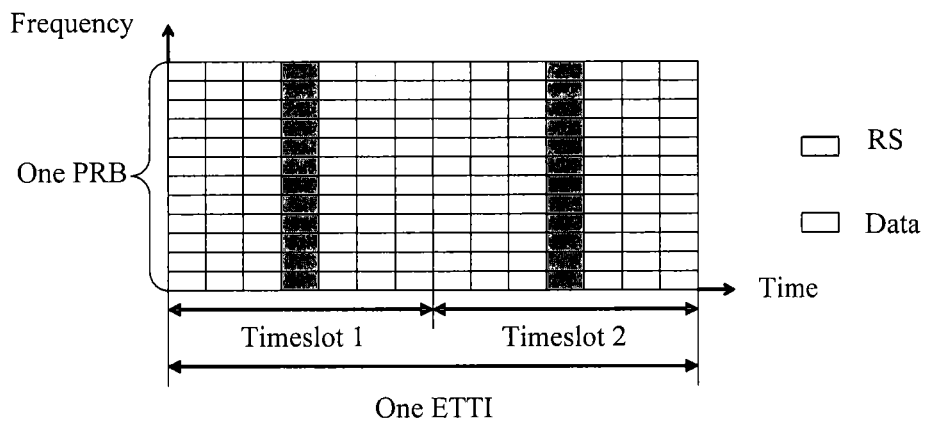
FIG. 2 is a schematic structural diagram of a TTI according to an embodiment of the present invention.

As shown in FIG. 1 is a schematic diagram of a method for generating an RS by a UE. The UE receives signaling of an evolved Node B (eNB, Evolved Node B), where the signaling includes physical resource blocks (PRBs, physical resource blocks) which are assumed to be 2 PRBs and allocated by the eNB to the UE, and CS information allocated to the UE; the UE generates a root sequence a(i) with the length being 24 (specifically, 12*2, where each PRB includes 12 subcarriers of one transmission time interval (TTI, Transmission Time Interval); in uplink transmission, the reference signal RS is placed in one middle symbol of each timeslot and a schematic structural diagram of the TTI is as shown in FIG. 2); the UE performs a cyclic shift on the root sequence a(i) according to the CS information in the signaling, to create a new basic sequence b(i); the UE performs inverse fast Fourier transform (IFFT) on the b(i), maps it onto a corresponding PRB, and sends it out.

Specifically, for the CS information which is allocated by the eNB to the UE and received by the UE, the CS adopted by the UE to send the RS may be determined according to formula (1) in the following:

$$n_{cs} = (n_{DMRS}^{(1)} + n_{DMRS}^{(2)} + n_{RPS}(n_s)) \bmod 12 \quad (1)$$

where, $n_{DMRS}^{(1)}$ is notified, in a broadcast manner, by a serving base station to all UEs in the cell; $n_{DMRS}^{(2)}$ is notified, in a unicast manner, by the serving base station to a UE; $n_{PRS}(n_s)$ is a random sequence, of which the value is different in different timeslots and the value decides a hopping rule of the cyclic shift, where the hopping rule is decided by a cell identifier (Cell ID), so that different cells have different hopping rules.

Figure 3:
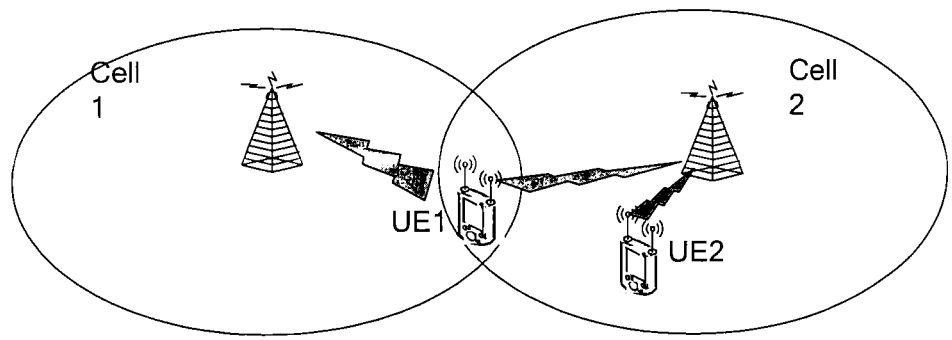
FIG. 3 shows a scenario where a CoMP technology is applied in a prior art.

FIG. 3 shows a scenario where a CoMP technology is applied in the prior art. UE1 belongs to cell 1, UE2 belongs to cell 2, UE1 and UE2 have resources overlapped at the scheduled frequency, and a signal of UE1 can be received by multiple cells. In FIG. 3, the signal of UE1 can be received by cell 1 and cell 2, so as to enhance the quality of the received signal. In the embodiment of the present invention, according to a principle that hopping rules of cyclic shifts of a UE belonging to a serving cell and a UE belonging to a coordinated cell are the same, the serving cell of UE1 controls an RS sent by UE1 and an RS sent by UE2 to use a same cyclic shift hopping rule, so that the RSs that are received by the coordinated cell (that is, cell 2) and transmitted by UE1 and UE2 are orthogonal, which reduces the interference between UE1 and UE2 and improves the performance on UE signal reception.

Figure 4:
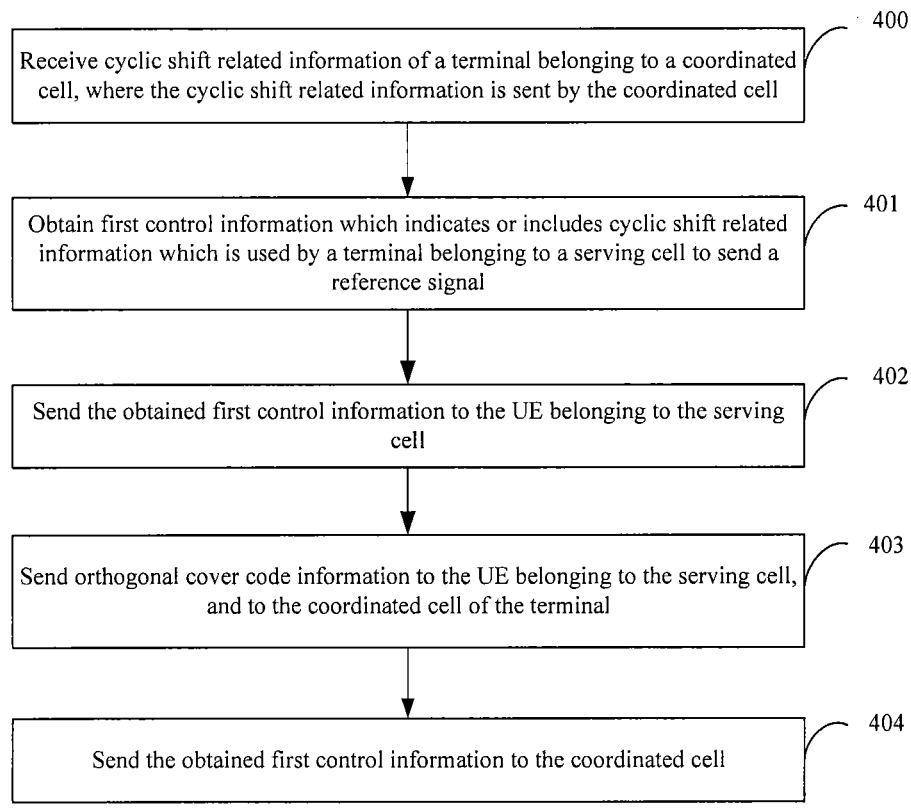
FIG. 4 is a flowchart of a method for obtaining first control information according to an embodiment of the present invention.

FIG. 4 is a flowchart of a method for generating a reference signal according to an embodiment of the present invention. The method includes:

Step 401: Obtain first control information, where the first control information indicates or includes cyclic shift related information which is used by a terminal belonging to a serving cell to send a reference signal.

The first control information may directly include the cyclic shift (CS) related information which is used by the UE belonging to the serving cell to send the reference signal, or may indicate that other information stored by the UE itself, such as a coordinated cell ID, is used by the UE as the cyclic shift related information.

According to the cyclic shift related information of a terminal belonging to a coordinated cell, and according to a principle that the variation rules of the cyclic shifts the UE belonging to the serving cell and the UE belonging to the coordinated cell are the same, the serving cell can determine a cyclic shift parameter which the UE belonging to the serving cell uses to send the reference signal. The coordinated cell may assist in the reception of a signal sent by the UE belonging to the serving cell, where the signal includes a reference signal and a data signal.

It should be noted that the serving cell may determine, according to a hopping rule of a cyclic shift of the UE in the coordinated cell, a hopping rule of a cyclic shift of the UE which belongs to and is served by the serving cell itself; or the serving cell determines a fixed cyclic shift hopping rule and notifies the coordinated cell, so that the UE belonging to the coordinated cell and the UE belonging to the serving cell determine cyclic shifts according to the fixed cyclic shift hopping rule. The description herein is intended to facilitate the understanding of the illustration of this embodiment and should not be understood as a limitation on this embodiment.

Step 402: Send the obtained first control information to the UE belonging to the serving cell.

It should be understood that, after the UE belonging to the serving cell receives the first control information, the UE generates the reference signal according to the CS information in the first control information, so that a cyclic shift hopping rule of the reference signal is the same as the cyclic shift hopping rule of the UE belonging to the coordinated cell, and sends the generated reference signal to base stations of the serving cell and the coordinated cell, and a base station in the coordinated cell receives the reference signal; and meanwhile, the UE belonging to the coordinated cell generates the reference signal and sends the generated reference signal to the base stations of the serving cell and the coordinated cell, and the base station in the coordinated cell receives the reference signal. When the UE belonging to the serving cell and the UE belonging to the coordinated cell use a same PRB and the root sequences a(i) for generating reference signals in the two UEs are the same, because the two UEs may adopt different cyclic shifts and the same cyclic shift hopping rule, the reference signal of the UE belonging to the serving cell and the reference signal of the UE belonging to the coordinated cell, which are received in the coordinated cell, are orthogonal. Therefore, the coordinated cell can demodulate signals from the UEs of the serving cell and the coordinated cell more accurately, and thereby, the signal transmission performance of the UEs is enhanced.

Further, to ensure better orthogonality between the RSs sent by UE1 and UE2, the method provided in the embodiment may further include:

Step 403: Send orthogonal cover code (OCC, orthogonal cover code) information to the UE belonging to the serving cell, and to the coordinated cell of the terminal.

Figure 5:
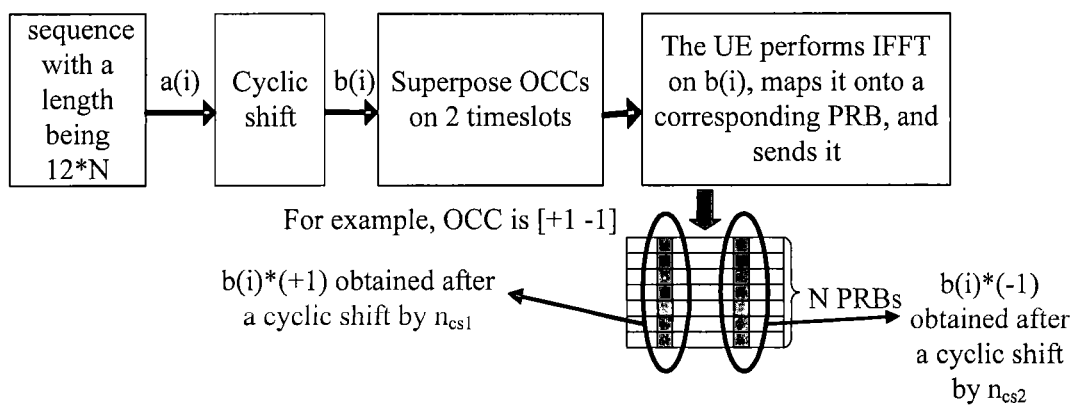
FIG. 5 is a schematic diagram of generating reference information by UE1 according to OCC information.

The OCC information may be used to superpose one layer of orthogonal cover codes on multiple reference signals in a same transmission time interval (TTI, Transmission Time Interval), so that when different orthogonal cover codes are allocated to UEs in different cells and hopping rules of cyclic shifts of the UEs are the same, reference signals sent by UEs in different cells are orthogonal. As shown in FIG. 5 is a schematic diagram of generating reference information by UE1 according to the OCC information. One TTI includes two timeslots and each timeslot includes one reference signal. It is assumed that OCCs include OCC [+1 +1] and OCC [+1 −1]. Each element of these OCCs corresponds to a code superposed on reference signals in the two timeslots. For example, OCC [+1 −1] represents that a reference signal of a first timeslot is multiplied by +1 and a reference signal of a second timeslot is multiplied by −1. The serving cell may allocate OCC [+1 +1] to UE1 and notify UE1 through signaling, and the coordinated cell may allocate OCC [+1 −1] to UE2 and notify UE2 through signaling. Because hopping rules of cyclic shifts of UE1 and UE2 are the same, reference signals sent by UE1 and UE2 are orthogonal. In addition, the serving cell shares the OCC information with the coordinated cell so that the coordinated cell obtains an OCC used by UE1 to send a reference signal and thereby may accordingly receive a reference signal sent by UE1. Meanwhile, the coordinated cell may avoid using the OCC, which is used by UE1, for the UE in the coordinated cell.

It should further be noted that the OCC information may be bound with the first control information, which thereby may reduce signaling. Alternatively, the OCC information sent by the serving cell may trigger UE1 to use the cell ID of the coordinated cell or an ID of a cell cluster to determine the hopping rule of the cyclic shift of the reference signal. The cell cluster generally includes the serving cell and the coordinated cell. After receiving the OCC information sent by the serving cell, UE1 uses the cell ID of the coordinated cell or the ID of the cell cluster to determine the hopping rule of the cyclic shift of the reference signal, and generates the reference signal according to the OCC carried in the OCC information. (In this case, another function of the OCC information sent by the serving cell is the same as a function of the first control information described in the subsequent part, that is, used to trigger UE1 to generate a new cyclic shift hopping rule, so that UE1 may generate a new reference signal according to the new cyclic shift hopping rule.)

Further, it should be noted that, before step 401, the method may further include:

Step 400: Receive cyclic shift related information of the terminal belonging to the coordinated cell, where the cyclic shift related information of the terminal belonging to the coordinated cell is sent by the coordinated cell.

According to formula (1), according to which the eNB allocates the CS to a UE in the prior art, it can be known that the cyclic shift determined by the coordinated cell (cell 2) for UE2 is determined according to a cell 2 specific (Cell specific) cyclic shift parameter, a UE2 specific (UE specific) cyclic shift parameter, and an identifier (ID) of cell 2. An example of the cell specific cyclic shift parameter is $n_{DMRS}^{(1)}$ in formula (1), where the cell notifies, in a broadcast manner, the parameter to all UEs in the cell; an example of the UE2 specific cyclic shift parameter is $n_{DMRS}^{(2)}$ in formula (1), where the cell notifies, in a unicast manner, the parameter to UE2 in the cell. Therefore, the serving cell may obtain, according to any one or any combination of the foregoing parameters, the hopping rule of the cyclic shift used by UE2 in the coordinated cell.

It should be noted that the first control information obtained in step 401 may also be obtained according to step 400 above.

Further, it should be noted that, the cyclic shift related information which is indicated or included by the first control information obtained in step 401 and used by the terminal belonging to the serving cell to send the reference signal may be used to control a cyclic shift value used for the reference signal sent by UE1 within one TTI, so that the variation rules of the cyclic shifts used by UE1 and UE2 are the same.

For example, a reference signal of UE1 in a first timeslot of a same TTI uses a cyclic shift with the value being CS1. The first control information may be used to control a cyclic shift in a second timeslot in the same TTI. That is, the first control information sent by the serving cell instructs UE1 to use a cyclic shift CS3 in the second timeslot. After receiving the first control information, UE1 uses CS3 to generate a reference signal in the second timeslot and sends the reference signal to the serving cell and the coordinated cell. The serving cell can control the value of CS3 to ensure that the hopping rule of the cyclic shifts (variation values are CS3−CS1) used for reference signals generated by UE1 in the two timeslots of the same TTI is the same as that of other UEs in the coordinated cell.

The foregoing illustration may also be so understood as that: when the CS of UE1 in the first timeslot of one TTI is determined, the CS of UE1 in the second timeslot is determined according to a hopping rule of UE2 in this TTI, so that UE1 and UE2 use the same CS hopping rule in a same TTI.

Further, the cyclic shift related information which is indicated or included by the first control information obtained in step 401 and used by the terminal belonging to the serving cell to send the reference signal may be used to control an offset value of a cyclic shift used for the reference signal sent by UE1 within one TTI, so that the same cyclic shift hopping rule is used by UE1 and UE2.

For example, the first control information may be used to control an offset value of cyclic shifts used for reference signals in two timeslots of a same TTI. The first control information sent by the serving cell indicates that the cyclic shift offset value used by UE1 in the two timeslots of the same TTI is CS4, and then, after UE1 receives the first control information, UE1 uses CS2+CS4 to generate the reference signal in the second timeslot and sends the reference signal to the serving cell (cell 1) and the coordinated cell (cell 2). The serving cell may control the value of CS4 to ensure that the hopping rule of the cyclic shifts (the variation value is CS4) used for the reference signals generated by UE1 in the two timeslots of one TTI is the same as that of other UEs in the coordinated cell.

Further, the cyclic shift related information which is indicated or included by the first control information obtained in step 401 and used for the terminal belonging to the serving cell to send the reference signal may also be used to control UE1 to generate a reference signal according to a new cyclic shift hopping rule. The new cyclic shift hopping rule of UE1 is normally different from the hopping rule of the cyclic shift of the serving cell.

The cyclic shift (CS) related information that is included by the first control information and required by the reference signal sent by UE1 may specifically further include the cell ID of the coordinated cell.

After UE1 receives the cell ID of the coordinated cell, $n_{PRS}(n_s)$ is obtained according to the cell ID of the coordinated cell, and $n_{DMRS}^{(1)}$ and $n_{DMRS}^{(2)}$ are preconfigured in the base station of the serving cell. The cyclic shift used for the reference signal may be determined according to formula (1). In this way, UE1 in the serving cell uses the same hopping rule as the UE in the coordinated cell.

The cyclic shift (CS) related information that is included by the first control information and required by the reference signal sent by UE1 may specifically further include the ID of the cell cluster to which the coordinated cell belongs.

After UE1 receives the cell ID of the coordinated cell, $n_{PRS}(n_s)$ is obtained according to the ID of the cell cluster, and $n_{DMRS}^{(1)}$ and $n_{DMRS}^{(2)}$ are preconfigured in the base station of the serving cell. The cyclic shift used by the reference signal may be determined according to formula (1). In a CoMP system, multiple cells may use an ID of a same cell cluster; and therefore, when UEs belonging to multiple cells use the ID of the same cell cluster to determine cyclic shifts used for reference signals, the hopping rules of the cyclic shifts of the reference signals of these UEs are the same.

It should be further understood that, the cell ID of the coordinated cell or the ID of the cell cluster to which the coordinated cell belongs may be sent to UE1 by the serving base station through the first control information, but this embodiment is not limited to this method for obtaining the cell ID of the coordinated cell or the ID of the cell cluster to which the coordinated cell belongs. In a case where UE1 has already obtained the cell ID of the coordinated cell or the ID of the cell cluster to which the coordinated cell belongs, the first control information may not need to include the CS related information, and the first control information is used to trigger UE1 to generate the new cyclic shift hopping rule, so that UE1 may generate the reference signal according to the new cyclic shift hopping rule.

For example, when the serving cell pre-notifies, through signaling, UE1 of the ID of the coordinated cell or the ID of the cell cluster to which the coordinated cell belongs, the first control information is trigger signaling. When the serving cell sends the first control information to UE1, UE1 is triggered to use the previously received cell ID of the coordinated cell or ID of the cell cluster, to which the coordinated cell belongs, to obtain $n_{PRS}(n_s)$, and generate, according to formula (1), the cyclic shift used to generate a reference signal.

For another example, the cell ID of the coordinated cell or the ID of cell cluster to which the coordinated cell belongs may be detected and reported to the serving cell by UE1, and the first control information is trigger signaling. In an LTE system, UE1 may detect a signal of a neighboring cell and when the signal strength of the neighboring cell is strong enough, UE1 reports a cell ID of the neighboring cell to the serving cell. When the serving cell sends the first control information to UE1, UE1 is triggered to use the previously reported cell ID or ID of the cell cluster to obtain $n_{PRS}(n_s)$, and determine, according to formula (1), the cyclic shift used for the reference signal; and the serving cell receives, according to the corresponding cyclic shift, the reference signal sent by UE1.

Further, the cyclic shift related information which is indicated or included by the first control information obtained in step 401 and used by the terminal belonging to the serving cell to send the reference signal may be used to control UE1 to use a cyclic shift, which does not hop, to generate a reference signal; then, the method in the embodiment further includes: notifying, by the serving cell, the UE in the coordinated cell of using the same cyclic shift, which does not hop, to generate a reference signal.

When the serving cell sends the first control information to UE1, UE1 uses a same cyclic shift for every reference signal. The cyclic shift value may be a preset fixed value; or is decided by a cell specific or UE specific cyclic shift parameter of the serving cell, for example the cyclic shift value equals $n_{DMRS}^{(1)}$ or $n_{DMRS}^{(2)}$ or is jointly decided by the cell specific and UE specific cyclic shift parameters of the serving cell, for example the cyclic shift value equals $(n_{DMRS}^{(1)}+n_{DMRS}^{(2)})$ mod 12. The serving cell notifies all UEs in the coordinated cell of using a same CS, which ensures that UE in the serving cell and UE in the coordinated cell use the same hopping rule.

Further, the cyclic shift related information which is indicated or included by the first control information obtained in step 401 and used for the terminal belonging to the serving cell to send the reference signal may be used to control UE1 to generate the reference signal according to a rule that a same cyclic shift is used within each TTI and different cyclic shifts are used for reference signals in different TTIs; and the method in this embodiment may further include: notifying, by the serving cell, the coordinated cell of a rule of controlling UE2 to use the same cyclic shift within each TTI and use different cyclic shifts for reference signals of different TTIs, where the same cyclic shift hopping rule is used for reference signals of UE1 and UE2.

It should be noted that a hopping rule of the cyclic shift value used for reference signals of UE1 at different time points may be a random sequence. For example, a cyclic shift value used by UE1 in the $n_s^{th}$ timeslot is as shown in formula (2):

$$n_{cs}=\{R[\text{floor}(n_s/2)*2]\} \bmod 12 \qquad (2)$$

where, floor($n_s/2$) represents rounding $n_s/2$ down to an integer, R is a random sequence, R($n_s$) is the $n_s^{th}$ value of random sequence R, which will not be repeated in detail in the following. The value of $n_{cs}$ is the same when the value of $n_s$ is 2i or 2i+1, where i is an integer. That is, in two consecutive timeslots of a same TTI, a same cyclic shift is used for reference signals of UE1 and different cyclic shifts are used in different TTIs. Furthermore, R($n_s$) may be different in different cells and therefore different hopping rules of cyclic shifts may be used in different cells, which brings a good randomization effect.

The foregoing formula is only an embodiment. The foregoing technical solution may be implemented through other formulas or by other means. For example, formula (3) may be replaced by $$n_{cs} = \begin{cases} \{R(n)_s\}\text{Mod}12, & \text{when } n_s \text{ is an even number} \\ \{R(n_s-1)\}\text{Mod}12, & \text{when } n_s \text{ is an odd number} \end{cases},$$

which will not be described in detail herein.

In addition, a hopping rule of cyclic shift values used for reference signals of UE1 at different time points may also be determined according to the cell ID of the serving cell. For example, the cyclic shift value used by UE1 in the $n_s^{th}$ timeslot may be:

$$n_{cs} = \{R[\text{floor}(n_s/2)*2] + \text{Cell\_ID}\} \bmod 12 \quad (4)$$

In the formula, Cell_ID is the cell ID of the serving cell. In this way, different cells have different cell IDs, and thereby, the different cells have different variation rules of cyclic shifts.

In addition, the hopping rule of the cyclic shift values used for the reference signals of UE1 at different time points may be determined according to the cell specific cyclic shift parameter and/or UE1 specific cyclic shift parameter. For example, the cyclic shift value used by UE1 in the $n_s^{th}$ timeslot may be as shown in formula (5):

$$n_{cs} = (n_{DMRS}^{(1)} + n_{DMRS}^{(2)} + R[\text{floor}(n_s/2)*2]) \bmod 12 \quad (5)$$

Therefore, cyclic shifts used for the reference signals sent by UE1 can be more flexibly controlled.

Further, in a scenario where the coordinated cell cannot naturally know the cyclic shift used by UE1, after step 401 in the embodiment, the method may further include:

Step 404: Send the obtained first control information to the coordinated cell.

Step 404 is added so that the coordinated cell knows the cyclic shift used by UE1 and may accordingly receive the reference signal sent by UE1.

Optionally, after obtaining the cyclic shift related information allocated for the UE belonging to the serving cell, the coordinated cell may control, according to the cyclic shift related information, the hopping rule of the cyclic shift, which the terminal belonging to the coordinated cell uses to generate the reference signal, to be the same as the hopping rule of the cyclic shift the UE belonging to the serving cell uses to generate a reference signal.

Further, it should be understood that, the information sent by the serving cell to UE1 may be the information which needs to be sent in step 401, step 403, or step 404 and is sent by the serving cell to UE1 or the coordinated cell each time when the serving cell allocates resources to UE1. The information may be sent to UE1 semi-statically. This can be understood as that, after the serving cell notifies UE1 of the related information, UE1 will keep using the instruction carried in the information until next time when new information from the serving cell is received. Moreover, the information sent by the serving cell may be carried on a control channel (for example a physical broadcast channel (PBCH, Physical Broadcast Channel), or a physical downlink control channel (PDCCH, Physical Downlink Control Channel), or a physical downlink shared channel (PDSCH, Physical Downlink Shared Channel) in a broadcast, multicast, or unicast manner.

Figure 6:
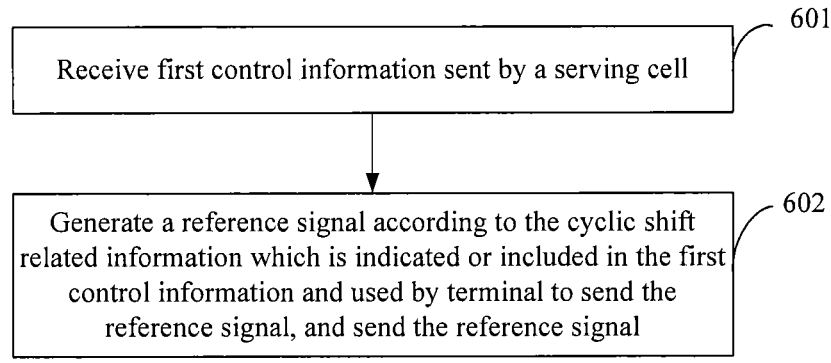
FIG. 6 is a flowchart of a method for generating a reference signal according to an embodiment of the present invention.

FIG. 6 is a flowchart of a method for generating a reference signal according to an embodiment of the present invention. In the embodiment, UE1 belonging to a serving cell generates reference information according to a principle that a variation rule of a cyclic shift used by a terminal in the serving cell is the same as that used by a UE of a coordinated cell, so that a reference signal sent by the UE and a reference signal sent by a UE belonging to a cell, which are received by the coordinated cell, has better orthogonality, and thereby, the reception performance of the coordinated cell is enhanced. Specifically, the method for generating a reference signal includes the following steps:

Step 601: Receive first control information sent by the serving cell.

For detailed illustration of the first control information sent by the serving cell, reference may be made to the foregoing illustration of the method for obtaining the first control information, and the details are not repeated herein.

Step 602: Generate a reference signal according to the cyclic shift related information which is indicated or included by the first control information and used by terminal to send the reference signal, and send the reference signal.

The variation rule of the cyclic shift which the terminal uses to generate the reference signal is the same as that of the cyclic shift which the terminal belonging to the coordinated cell uses to generate a reference signal.

Step 602 may specifically include:

Step 6021: Generate a root sequence a(i).

Step 6022: According to the received cyclic shift related information which is indicated or included by the first control information and used by the terminal to send the reference signal, perform a cyclic shift on the root sequence a(i) to generate a basic sequence b(i).

Step 6023: Map the basic sequence b(i) onto a physical resource block and send it as the reference signal.

In the method for generating a reference signal, when the UE belonging to the serving cell and the UE belonging to the coordinated cell use the same PRB and root sequences a(i) for generating reference signals in the two UEs are the same, because the two UEs adopt different cyclic shifts and a same cyclic shift hopping rule, the reference signal of the UE belonging to the serving cell and the reference signal of the UE belonging to the coordinated cell, which are received in the coordinated cell, are orthogonal, so that the coordinated cell can demodulate signals of the two cells more accurately, and thereby, the signal transmission performance of the UEs is enhanced.

Further, the method may include:

Step 603: Receive orthogonal cover code information sent by the serving cell; step 603 may be executed before or after step 601.

Then, after step 6022, the method further includes:

Step 6022': Superpose an orthogonal cover code on the basic sequence b(i) according to the OCC information, to obtain b(i) which the orthogonal cover code has been superposed on.

The OCC may be included in the OCC information and sent by the serving cell, or may also be selected from preconfigured OCCs according to the indication of the OCC information. The description herein is for easy understanding of the illustration and should not be understood as a limitation on this embodiment.

Step 6023 specifically includes mapping the basic sequence b(i) which the orthogonal cover code has been superposed on onto a physical resource block, and sending it as the reference signal.

For a detailed illustration of step 6022', reference may be made to FIG. 5 and its illustration.

Because step 6022' is added, in the method, the hopping rule of the cyclic shift of reference signal sent by UE1 is the same as the hopping rule of the cyclic shift of the coordinated cell, and the OCC is superposed on the reference signal, so that the reference signal of UE1 and the reference signal of UE2, which are received in the coordinated cell, are orthogonal, which enhances the reception performance of the coordinated cell.

Figure 7:
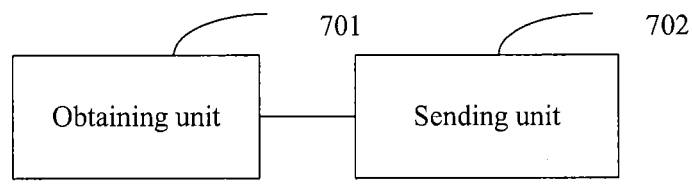
FIG. 7 is a schematic diagram of logical units of a base station according to an embodiment of the present invention.

FIG. 7 is a schematic diagram of logical units of a base station according to an embodiment of the present invention. The base station may be a base station in a serving cell. The base station includes an obtaining unit 701 and a sending unit 702.

The obtaining unit 701 is configured to obtain first control information, where the first control information indicates or includes cyclic shift related information which is used by the terminal to send a reference signal.

It should be noted that the obtaining unit 701 in the base station may determine, according to a hopping rule of a cyclic shift of a UE in a coordinated cell, a hopping rule of a cyclic shift of the UE belonging to the base station itself; or the obtaining unit 701 in the base station determines a fixed cyclic shift hopping rule and notifies the coordinated cell, so that the UE belonging to the coordinated cell and the UE belonging to the serving cell determine cyclic shifts according to the fixed cyclic shift hopping rule. The description herein is intended to facilitate understanding of the illustration of this embodiment and should not be understood as a limitation on the embodiment.

The sending unit 702 is configured to send the first control information to the terminal belonging to the serving cell, so that the terminal belonging to the serving cell generates the reference signal according to the cyclic shift related information which is indicated or included by the first control information and used by the terminal to send the reference signal, where the variation rule of the cyclic shift which the terminal belonging to the serving cell uses to generate the reference signal is the same as that of the cyclic shift which the terminal belonging to the coordinated cell uses to generate a reference signal.

With the base station provided in the embodiment, after receiving the first control information, UE1 generates the reference signal according to the CS information in the first control information, and sends the reference signal, which is received by the base station in the coordinated cell. Meanwhile, the UE belonging to the coordinated cell uses the same cyclic shift hopping rule as that of the UE belonging to the serving cell, to generate a reference signal and sends the reference signal, which is also received by the base station in the coordinated cell. When the UE belonging to the serving cell and the UE belonging to the coordinated cell use a same PRB and root sequences a(i) for generating reference signals in the two UEs are the same, because the two UEs use the same cyclic shift hopping rule, the reference signal of the UE belonging to the serving cell and the reference signal of the UE belonging to the coordinated cell, which are received in the coordinated cell, are orthogonal, so that the coordinated cell can demodulate signals of the two cells more accurately, and thereby, the signal transmission performance of the UEs is enhanced.

Further, to make orthogonality between the RSs sent by UE1 and UE2 better, the sending unit 702 is further configured to send orthogonal cover code (OCC, Orthogonal Convolutional Code) information configured for the UE belonging to the serving cell, to the coordinated cell and the UE belonging to the serving cell.

The sending unit 702 is further configured to send the obtained first control information to the coordinated cell.

The sending unit 702 sends the obtained first control information to the coordinated cell, so that the coordinated cell knows a cyclic shift used by UE1 and may accordingly receive the reference signal sent by UE1.

Further, the base station provided in the embodiment includes: a receiving unit, configured to receive cyclic shift related information of the terminal belonging to the coordinated cell, where the cyclic shift related information of the terminal belonging to the coordinated cell is sent by the coordinated cell.

Therefore, the obtaining unit 702 may obtain the first control information according to the cyclic shift related information of the terminal belonging to the coordinated cell, where the cyclic shift related information of the terminal belonging to the coordinated cell is received by the receiving unit.

The base station provided in the embodiment may be further illustrated with reference to the illustration of the base station in the serving cell in the method for generating the reference signal provided in the embodiment of the present invention, and the description is not repeated.

Figure 8:
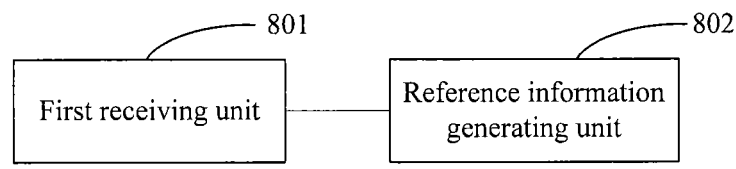
FIG. 8 is a schematic diagram of logical units of a terminal according to an embodiment of the present invention.

FIG. 8 is a schematic diagram of logical units of a terminal according to an embodiment of the present invention. The terminal includes a first receiving unit 801 and a reference signal generating unit 802.

The first receiving unit 801 is configured to receive first control information sent by a serving cell, where the first control information indicates or includes cyclic shift related information which is used by the terminal to send a reference signal.

The reference signal generating unit 802 is configured to generate the reference signal according to the cyclic shift related information which is indicated or included by the first control information and used by the terminal to send the reference signal, and send the reference signal, where a variation rule of a cyclic shift which the terminal uses to generate the reference signal is the same as that of a cyclic shift which a terminal belonging to a coordinated cell uses to generate a reference signal.

The reference signal generating unit 802 may further include:

a sequence generating unit, configured to generate a sequence a(i);

a cyclic shift unit, configured to perform, according to the received cyclic shift related information which is indicated or included by the first control information and used by the terminal to send the reference signal, a cyclic shift on the root sequence a(i) to generate a basic sequence b(i); and a first sending unit, configured to map the basic sequence b(i) onto a physical resource block and send it as the reference signal.

With the terminal provided in the embodiment of the present invention, when the UE belonging to the serving cell and the UE belonging to the coordinated cell use a same PRB and root sequences a(i) for generating reference signals in the two UEs are the same, because the two UEs use the same cyclic shift hopping rule, the reference signal of the UE belonging to the serving cell and the reference signal of the UE belonging to the coordinated cell, which are received in the coordinated cell, are orthogonal, so that the coordinated cell can demodulate signals of the two cells more accurately, and thereby the signal transmission performance of the UEs is enhanced.

Further, the terminal includes a superposing unit, configured to superpose an orthogonal cover code on the basic sequence b(i) according to the OCC information, and specifically, superpose orthogonal cover codes on b(i) in a same transmission time interval.

The OCC may be included in the OCC information and sent by the serving cell, or may also be selected from preconfigured OCCs according to the indication of the OCC information. The description herein is for easy understanding of the illustration, and should not be understood as a limitation on the embodiment.

The first sending unit is specifically configured to map the basic sequence b(i) which the orthogonal cover code has been superposed on onto a physical resource block, and send it as the reference signal.

Because the superposing unit is added, when the hopping rule of the cyclic shift of the reference signal sent by the terminal is the same as the hopping rule of the cyclic shift of the coordinated cell and the OCC is superposed on the reference signal, the reference signal of the terminal and the reference signal of UE2, which are received in the coordinated cell, are orthogonal, and thereby, the reception performance of the coordinated cell is enhanced.

Persons of ordinary skill in the art can understand that all or part of the steps in the methods provided in the foregoing embodiments can be implemented by a computer program instructing relevant hardware. The program may be stored in a computer readable storage medium and when the program is executed, the procedures in the foregoing method embodiments are executed. The storage medium may be a magnetic disk, a CD-ROM, a read-only memory (Read-Only Memory, ROM), or a random access memory (Random Access Memory, RAM) and so on.

The embodiments of the present invention are illustrated in detail above. Although the present invention is described with reference to specific implementation manner, the illustration of the foregoing embodiments is only intended to help understand the method and device of the present invention. With respect to the specific implementation manners and applicable scope, modifications and variations may be made by persons of ordinary skill in the art according to the idea of the present invention. Therefore, the content of this specification shall not be construed as a limitation on the present invention.

What is claimed is:

1. A method for generating a reference signal, comprising:
    obtaining first control information, wherein the first control information indicates or comprises cyclic shift related information which is used to control an offset value of cyclic shifts in two timeslots of a same transmission time interval (TTI); and
    sending the first control information to a terminal belonging to the serving cell, so that the terminal belonging to the serving cell generates the reference signal according to the cyclic shift related information which is indicated or comprised by the first control information and used by the terminal to send the reference signal, wherein a variation rule of a cyclic shift which the terminal belonging to the serving cell uses to generate the reference signal is the same as that of a cyclic shift which a terminal belonging to a coordinated cell uses to generate a reference signal, and the cyclic shift which the terminal belonging to the serving cell uses to generate the reference signal is different from the cyclic shift which the terminal belonging to the coordinated cell uses to generate the reference signal;
    sending orthogonal cover code (OCC) information to the terminal belonging to the serving cell, the OCC information is used to superpose an orthogonal cover code on the reference signals in a same TTI, wherein, the OCC allocated to the terminal belonging to the serving cell is different from an OCC allocated to the terminal belonging to the coordinated cell.

2. The method according to claim 1, wherein, before the obtaining the first control information, the method further comprises:
    receiving cyclic shift related information of the terminal belonging to the coordinated cell, wherein the cyclic shift related information is sent by the coordinated cell; and
    the obtaining the first control information comprises:
    obtaining the first control information according to the received cyclic shift related information of the terminal belonging to the coordinated cell.

3. The method according to claim 1, after the obtaining the first control information, further comprising:
    sending the obtained first control information to the coordinated cell.

4. A method for generating a reference signal, comprising:
    receiving, by a terminal belonging to a serving cell, first control information sent by the serving cell, wherein the first control information is used to indicate cyclic shift related information which is used to control an offset value of cyclic shifts in two timeslots of a same transmission time interval (TTI); and
    receiving, by the terminal, orthogonal cover code (OCC) information sent by the serving cell, the OCC information is used to superpose an orthogonal cover code on the reference signals in a same TTI;
    generating, by the terminal, the reference signal according to the cyclic shift related information and the orthogonal cover code information, and sending the reference signal, wherein a variation rule of a cyclic shift which the terminal uses to generate the reference signal is the same as that of a cyclic shift which a terminal belonging to a coordinated cell uses to generate a reference signal, and the cyclic shift which the terminal belonging to the serving cell uses to generate the reference signal is different from the cyclic shift which the terminal belonging to the coordinated cell uses to generate the reference signal; and the OCC allocated to the terminal belonging to the serving cell is different from an OCC allocated to the terminal belonging to the coordinated cell.

5. The method according to claim 4, wherein the generating, by the terminal, a reference signal according to the first control information and the orthogonal cover code information, and sending the reference signal comprise:
    generating a root sequence a(i);
    according to the received cyclic shift related information, performing a cyclic shift on the root sequence a(i) to generate a basic sequence b(i);
    superposing an orthogonal cover code on the basic sequence b(i) according to the orthogonal cover code information; and
    mapping the basic sequence b(i) which the orthogonal cover code has been superposed on onto the physical resource block, and sending it as the reference signal.

6. A base station, comprising:
    a processor, configured to obtain first control information and orthogonal cover code (OCC) information, wherein the first control information indicates or comprises cyclic shift related information which is used to control an offset value of cyclic shifts in two timeslots of a same transmission time interval (TTI), and the OCC information is used to superpose an OCC on the reference signals in a same TTI; and
    a transmitter, configured to send the first control information and the OCC information to a terminal belonging to a serving cell, so that the terminal belonging to the serving cell generates the reference signal according to the cyclic shift related information and the OCC information, wherein a variation rule of a cyclic shift which the terminal belonging to the serving cell uses to generate the reference signal is the same as that of a cyclic shift which a terminal belonging to a coordinated cell uses to generate the reference signal, and the cyclic shift which the terminal belonging to the serving cell uses to generate the reference signal is different from the cyclic shift which the terminal belonging to the coordinated cell uses to generate the reference signal; and the OCC allocated to the terminal belonging to the serving cell is different from an OCC allocated to the terminal belonging to the coordinated cell.

7. The base station according to claim 6, further comprising:
- a receiver, configured to receive cyclic shift related information of the terminal belonging to the coordinated cell, wherein the cyclic shift related information of the terminal belonging to the coordinated cell is sent by the coordinated cell; wherein
- the obtaining unit is specifically configured to obtain the first control information according to the received cyclic shift related information of the terminal belonging to the coordinated cell.

8. The base station according to claim 6, wherein the transmitter is further configured to send the obtained first control information to the coordinated cell.

9. A terminal, comprising:
- a receiver, configured to receive first control information sent by a serving cell and orthogonal cover code (OCC) information sent by the serving cell, wherein the first control information indicates or comprises cyclic shift related information which is used to control an offset value of cyclic shifts in two timeslots of a same transmission time interval (TTI), and the OCC information is used to superpose an orthogonal cover code on the reference signals in a same TTI;
- a processor, configured to generate the reference signal according to the cyclic shift related information and the orthogonal cover code information, and
- a transmitter, configured to send the reference signal, wherein a variation rule of a cyclic shift which the terminal uses to generate the reference signal is the same as that of a cyclic shift a terminal belonging to a coordinated cell uses to generate a reference signal, and the cyclic shift which the terminal belonging to the serving cell uses to generate the reference signal is different from the cyclic shift which the terminal belonging to the coordinated cell uses to generate the reference signal; and the OCC allocated to the terminal belonging to the serving cell is different from an OCC allocated to the terminal belonging to the coordinated cell.

10. The terminal according to claim 9, wherein the processor configured to generate the reference signal according to the cyclic shift related information and the orthogonal cover code information comprises:
- the processor configured to
- generate a root sequence a(i);
- perform, according to the received cyclic shift related information, a cyclic shift on the root sequence a(i) to generate a basic sequence b(i);
- superpose an orthogonal cover code on the basic sequence b(i) according to the orthogonal cover code information; and
- map the basic sequence b(i) which the orthogonal cover code has been superposed on onto the physical resource block, and sending it as the reference signal.

* * * * *